(12) United States Patent  
Nawasra et al.

(10) Patent No.: US 10,215,553 B2  
(45) Date of Patent: Feb. 26, 2019

(54) THIN PSD FOR LASER-SCANNING SYSTEMS

(71) Applicant: Apple Inc., Cupertino, CA (US)

(72) Inventors: Jawad Nawasra, San Francisco, CA (US); Matthew C. Waldon, San Francisco, CA (US); Scott T. Smith, San Jose, CA (US); Thomas M. Gregory, Cambridgeshire (GB)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 15/065,904

(22) Filed: Mar. 10, 2016

(65) Prior Publication Data

US 2016/0265902 A1  Sep. 15, 2016

Related U.S. Application Data

(60) Provisional application No. 62/131,904, filed on Mar. 12, 2015.

(51) Int. Cl.
   *H01J 40/14*  (2006.01)
   *G01B 11/00*  (2006.01)
   *G02B 26/12*  (2006.01)
   *G02B 26/10*  (2006.01)

(52) U.S. Cl.
   CPC ............ *G01B 11/00* (2013.01); *G02B 26/127* (2013.01); *G02B 26/105* (2013.01)

(58) Field of Classification Search
   CPC .............................. G01B 11/00; G02B 26/00
   USPC .............. 250/205, 214.1; 257/184, E31.019
   See application file for complete search history.

(56) References Cited

U.S. PATENT DOCUMENTS

| | | | |
|---|---|---|---|
| 3,997,715 A | 12/1976 | Elliott | |
| 4,454,422 A | 6/1984 | Persyk | |
| 4,762,993 A | 8/1988 | Moses | |
| 5,481,109 A | 1/1996 | Ninomiya et al. | |
| 5,937,026 A | 8/1999 | Satoh | |
| 6,207,958 B1 | 3/2001 | Giakos | |
| 6,429,417 B1 | 8/2002 | Street et al. | |
| 6,862,076 B2 | 3/2005 | Mulder et al. | |
| 8,669,588 B2 | 3/2014 | Smith et al. | |
| 8,829,406 B2 | 9/2014 | Akerman et al. | |
| 9,450,670 B1* | 9/2016 | Fleischer | H04B 10/11 |
| 9,829,445 B2* | 11/2017 | Nawasra | G01N 21/958 |
| 2004/0079872 A1* | 4/2004 | Suda | G02B 26/127 |
| | | | 250/234 |
| 2010/0308371 A1 | 12/2010 | Bui et al. | |

(Continued)

OTHER PUBLICATIONS

Nawasra et al, U.S. Appl. No. 14/957,643 dated Dec. 3, 2015.

(Continued)

*Primary Examiner* — Kevin Pyo
(74) *Attorney, Agent, or Firm* — Kligler & Associates

(57) ABSTRACT

Embodiments described include a system comprising a position sensing device (PSD) and a light source. The light source is configured to, by passing one or more light beams through the PSD, cause one or more electrical currents to flow through the PSD. The system further comprises a processor, configured to (i) in response to the electrical currents, ascertain an amount of power that is delivered by the light source, and (ii) in response to the amount of power exceeding a threshold amount of power, inhibit the light source from further operation. Other embodiments are also described.

18 Claims, 3 Drawing Sheets

(56) References Cited

U.S. PATENT DOCUMENTS

2015/0145097 A1   5/2015   Basu et al.
2016/0265902 A1   9/2016   Nawasra et al.

OTHER PUBLICATIONS

Hamamatsu., "Characteristic and Use", 7 pages, Jan. 19, 2011 www.hamamatsu.com/resources/pdf/ssd/psd_techinfo_e.pdf.
U.S. Appl. No. 14/957,643 Office Action dated May 18, 2017.

* cited by examiner

THIN PSD FOR LASER-SCANNING SYSTEMS

CROSS-REFERENCE TO RELATED APPLICATIONS

The present application claims the benefit of U.S. Provisional Application 62/131,904, filed Mar. 12, 2015, whose disclosure is incorporated herein by reference.

FIELD OF THE DISCLOSURE

Embodiments described herein relate to the monitoring and control of lasers, such as in laser-scanning systems.

BACKGROUND

Laser-scanning systems, such as LIDAR and laser projection systems, emit, in sequence, a plurality of collimated beams of visible or invisible (e.g., infrared (IR) or ultraviolet (UV)) light, such as to irradiate a target with a sequence of spots.

U.S. Pat. No. 6,429,417, whose disclosure is incorporated herein by reference, describes a system to align optical components. The system utilizes a highly transmissive sensor positioned in the optical path of an optical signal to determine the precise position of the optical signal. A feedback loop uses output from the highly transmissive sensor to readjust elements, thus maintaining the optical signal in a desired position. The current system is particularly suitable for use in an optical cross switch.

SUMMARY OF EMBODIMENTS

There is provided, in accordance with some embodiments of the present invention, a system that includes a position sensing device (PSD) and a light source. The light source is configured to, by passing one or more light beams through the PSD, cause one or more electrical currents to flow through the PSD. The system further includes a processor, configured to (i) in response to the electrical currents, ascertain an amount of power that is delivered by the light source, and (ii) in response to the amount of power exceeding a threshold amount of power, inhibit the light source from further operation.

In some embodiments, the light source is a laser, and the system further includes a laser-scanning module that includes the laser, the PSD being positioned at an exit aperture of the laser-scanning module.

In some embodiments,
the laser-scanning module is configured to perform a scan by, using the laser, emitting a plurality of light beams that include the one or more light beams, and
the processor is configured to inhibit the laser from further operation by aborting the scan.

In some embodiments, the processor is configured to:
ascertain the amount of power that is delivered by the laser during each of a plurality of time periods over which the scan occurs, and
in response to the amount of power exceeding the threshold amount of power during any one of the time periods, abort the scan before an end of a next one of the time periods.

In some embodiments, the processor is further configured to:
in response to the electrical currents, ascertain a range of the scan, and
in response to the range being narrower than a threshold range, inhibit the laser from further operation by inhibiting the laser-scanning module from repeating the scan.

In some embodiments, the processor is configured to ascertain the amount of power that is delivered by the light source by ascertaining an amount of power per unit area that is delivered by the light source.

In some embodiments, the system further includes a beam-spreading element, and the processor is further configured to:
in response to the electrical currents, ascertain a measure of spreading by which the beam-spreading element has spread the light beams, and
in response to the measure of spreading being less than a threshold measure of spreading, inhibit the light source from further operation.

In some embodiments, the beam-spreading element is selected from the group consisting of: a diffractive optical element, and an optical diffuser.

In some embodiments, the PSD includes a photosensitive material including a thin region having a thickness of less than 10 μm, the light source being configured to pass the one or more light beams through the thin region of the photosensitive material.

In some embodiments, the photosensitive material includes a material selected from the group consisting of: silicon, indium gallium arsenide, and germanium.

In some embodiments, the photosensitive material is organic.

In some embodiments, the thin region of the photosensitive material is at least partly surrounded by a thicker region of the photosensitive material having a thickness that is greater than the thickness of the thin region.

In some embodiments, the thickness of the thin region of the photosensitive material is less than 5 μm.

In some embodiments, the system further includes an optically transparent support, which is configured to provide structural support to the thin region of the photosensitive material, coupled to the thin region of the photosensitive material.

In some embodiments, the optically transparent support includes a glass substrate.

In some embodiments, the optically transparent support includes an epoxy.

There is further provided, in accordance with some embodiments of the present invention, a method for operating a light source. Using the light source, by passing one or more light beams through a position sensing device (PSD), one or more electrical currents are caused to flow through the PSD. In response to the electrical currents, an amount of power that is delivered by the light source is ascertained. In response to the amount of power exceeding a threshold amount of power, the light source is inhibited from further operation.

There is further provided, in accordance with some embodiments of the present invention, a position sensing device (PSD) that includes (i) a photosensitive material, including a thin region having a thickness that is less than 10 μm, and (ii) an optically transparent support, which is configured to provide structural support to the thin region of the photosensitive material, coupled to the thin region of the photosensitive material.

The present disclosure will be more fully understood from the following detailed description of embodiments thereof, taken together with the drawings, in which:

DETAILED DESCRIPTION OF EMBODIMENTS

Overview

Figure 1:
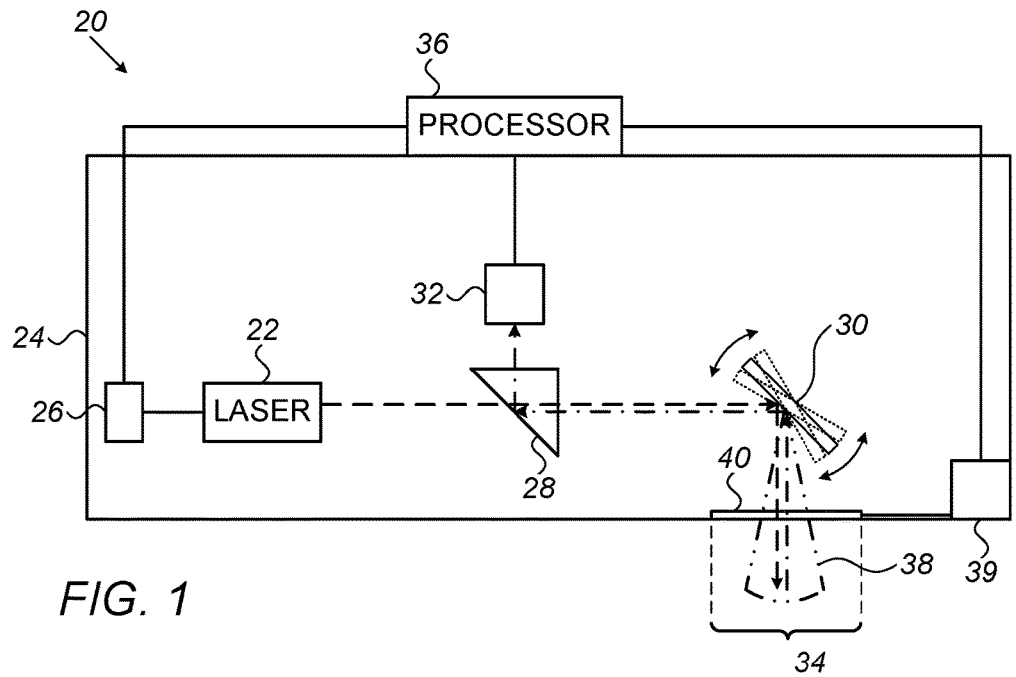
FIG. 1 is a schematic illustration of a laser-scanning system, in accordance with some embodiments described herein.

Laser-scanning systems are typically configured to keep the delivered power-per-area below a predetermined threshold value, e.g., to comply with the standards of the International Electrotechnical Commission (IEC).

In general, there are two primary cases of malfunction in which the delivered power-per-area fails to be less than the predetermined threshold:

(i) The laser beams may be emitted at a power level that is too high, e.g., due to malfunctioning electrical circuitry.

(ii) The scanning mirror may stop moving over the required full range of movement (e.g., due to breakage, debris, or faulty control commands). For example, in an extreme case of failure, movement of the mirror may cease entirely. In such cases, even if the power of the emitted laser beams is at the proper level, the area over which this power is spread is reduced, and hence, the delivered power-per-area exceeds the threshold.

There may be yet other causes for failure of the system, including, for example, the degradation of an optical coating. In any case, regardless of the cause, it is typically desired that the system be shut down as quickly as possible. Hence, it is important that the system be monitored, such that cases of failure may be quickly identified.

One approach to facilitating such monitoring is to implement a separate monitoring system for each potential source of failure. For example, a monitoring photodiode may be used to monitor the power of the emitted light, while position sensors may be used to monitor the position of the mirror. A disadvantage of this approach, however, is that the presence of multiple monitoring systems may add an undesirable level of complexity to the system. Moreover, as the number and/or complexity of such monitoring systems increases, the risk of failure in at least one of the monitoring systems also increases.

Hence, embodiments described herein provide a superior approach, by which a thin, transmissive position sensing device (PSD) is placed at the exit aperture of the laser-scanning system. The light beams emitted from the laser thus pass through the PSD, causing electrical currents to flow through the PSD. Since these electrical currents indicate the power with which, and the position at which, the light beams pass through the PSD, the PSD may be used to monitor the power and/or range of the emitted laser beams, such that cases of failure may be quickly identified. This approach is a "catch-all" approach, in the sense that a single monitoring system, comprising the PSD, is used, "downstream," to monitor the system as a whole. There is thus no need for a separate monitoring system for each of the potentially problematic "upstream" components (e.g., the laser and the mirror). Alternatively, even if the separate upstream monitoring systems are maintained, the PSD provides an added level of monitoring, which may be helpful in case of failure of any of the upstream monitoring systems.

Due to the thinness of the PSD, the PSD does not significantly attenuate the light emitted by the laser, such that the vast majority of the emitted light is delivered to the target.

System Description

Reference is initially made to FIG. 1, which is a schematic illustration of a laser-scanning system 20, in accordance with some embodiments described herein.

System 20 comprises a laser-scanning module 24, which may be configured to perform any suitable scanning routine. Module 24 may comprise, for example, a laser 22, a laser driver 26, a beam splitter 28, a scanning mirror 30, and a detector 32. Laser driver 26 causes laser 22 to emit a sequence of beams (or "pulses") of light (e.g., visible or IR light) through beam splitter 28, toward mirror 30. As laser 22 emits the sequence of beams, mirror 30 rotates through a predetermined sequence of rotation angles, such that the beams of light are reflected from the mirror, and through an exit aperture 34 of the module, at different respective angles. The rotational movement of the mirror thus defines an angular scan range 38, which may be alternatively referred to as the field of view of the scan.

Due to the different respective angles of reflection, the beams of light strike the target of interest at different respective positions. Each of the beams is reflected from the target of interest back through exit aperture 34, off the mirror, and off the beam splitter, whereupon the reflected light reaches detector 32, which generates a signal in response to the reflected light. This signal is received by a processor 36, which, by processing the signal, derives information regarding the target of interest.

Module 24 may be used, for example, to acquire a depth map of the target, by measuring the times-of-flight of each of the beams emitted during the scan. Such a scan may be performed multiple times, such as to acquire multiple frames of the depth map. (Acquiring multiple frames may be useful, for example, when tracking a moving target.)

To monitor the performance of module 24, embodiments described herein position a transmissive position sensing device (PSD) 40 at any suitable location along the path of transmission, such that the emitted light beams pass through PSD 40 on their way out of the module. For example, PSD 40 may be positioned at aperture 34, e.g., such that aperture 34 is completely covered by the PSD. As the light beams pass through the PSD, the PSD generates electrical currents that indicate the power and/or position of the light beams. The electrical currents are received by a PSD detector 39, which, in response to the electrical currents, generates signals that are received and processed by processor 36. Upon ascertaining, based on the signals, that the module is malfunctioning, the processor may shut down the laser-scanning module, by issuing an appropriate control signal to laser driver 26. (Since the signals from PSD detector 39 indicate the properties of the electrical currents, it may be said that the processor monitors the laser, e.g., by ascertaining the amount of power that is delivered by the laser, in response to the electrical currents.) Further details regarding this monitoring are provided below.

Although FIG. 1 shows a configuration in which the transmit and receive paths of light are coincident at the exit aperture, such that the received light also passes through the PSD, it is noted that other configurations, in which the received light follows a different path from that of the transmitted light and thus does not pass through the PSD, are also within the scope of the present disclosure.

In general, processor 36 may be implemented in hardware, firmware, or software, or in any suitable combination of hardware, firmware, and/or software elements. For example, in some embodiments, processor 36 comprises a random access memory (RAM) and a central processing unit (CPU) configured to execute program code that is loaded into the RAM.

It is noted that although the present disclosure describes processor 36 as performing both (i) imaging tasks related to signals received from detector 32, and (ii) monitoring tasks related to signals received from PSD detector 39, in some embodiments, a separate respective processor is dedicated to the performance of each class of tasks.

Figure 2:
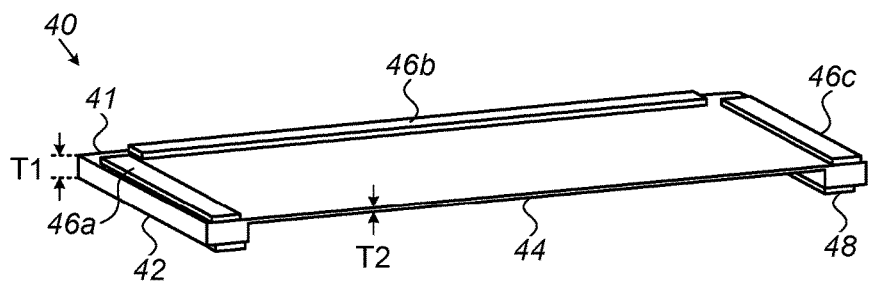
FIG. 2 presents a cut-through isometric view of a position sensing device, in accordance with some embodiments described herein.

Reference is now made to FIG. 2, which presents a cut-through isometric view of PSD 40, in accordance with some embodiments described herein.

PSD 40 comprises a photosensitive material 41, such as silicon, indium gallium arsenide, germanium, and/or an organic thin-film material. Typically, the choice of photosensitive material is a function of the range of wavelengths of the emitted light. For example, silicon may be used for wavelengths within the visible and near-infrared portions of the spectrum. As an alternative to silicon for visible light (400 nm-700 nm), an organic thin-film material may be used. For wavelengths higher than 1300 nm, or as an alternative to silicon for certain wavelengths below 1300 nm, indium gallium arsenide or germanium may be used.

Typically, photosensitive material 41 is coupled to a plurality of cathodes, and to an anode 48. For example, PSD 40 may comprise four cathodes: a first cathode 46a, a second cathode 46b, a third cathode 46c, and a fourth cathode, which is not shown in FIG. 2. Each one of the four cathodes is typically coupled to the photosensitive material near a different respective edge of the photosensitive material. Thus, FIG. 2 shows first cathode 46a and third cathode 46c positioned opposite one another at the "sides" of the PSD, while second cathode 46b, which is at the "top" of the PSD, is positioned opposite the fourth cathode, which is at the "bottom" of the PSD.

Upon a light beam striking the photosensitive material, the conductivity of the photosensitive material changes, causing electrical currents to flow between the cathodes and anode 48, through the photosensitive material. For example, for embodiments in which the PSD comprises four cathodes, four electric currents will flow across the PSD. These electrical currents are detected by detector 39 (FIG. 1), which reports the respective magnitudes of the currents to processor 36. The relative magnitudes of the currents indicate the position of the light beam, while the total magnitude of the currents indicates the power of the light beam.

For example, for the embodiment shown in FIG. 2, the PSD will generate two electric currents $I_1$ and $I_2$ at, respectively, the two opposite "sides" of the PSD, and two additional electric currents $I_3$ and $I_4$ at, respectively, the "top" and "bottom" of the PSD. (In other words, $I_1$ will flow between first cathode 46a and anode 48, $I_2$ will flow between third cathode 46c and anode 48, $I_3$ will flow between second cathode 46b and anode 48, and $I_4$ will flow between the fourth cathode and anode 48.) The horizontal position of the light beam is then given by $k_x*(I_2-I_1)/(I_2+I_1)$, where $k_x$ is a scale factor. Similarly, the vertical position of the light beam is given by $k_y*(I_4-I_3)/(I_4+I_3)$, where $k_y$ is another scale factor. The power of the light beam is given by $k_t*(I_1+I_2+I_3+I_4)$, where $k_t$ is yet another scale factor.

In embodiments described herein, photosensitive material 41 comprises a thin region 44, having a relatively small thickness T2. Thin region 44 may be formed, for example, by thinning a thicker piece of photosensitive material. For example, a piece of silicon having an initial thickness T1 may be thinned down to the lesser thickness T2. In some embodiments, only the center of the silicon is thinned, such that, following the thinning, thin region 44 is at least partly surrounded (i.e., "framed") by a thicker region 42 having the initial thickness T1. Thicker region 42 provides structural stability to the PSD, thus facilitating the manufacturing process for the PSD, and/or facilitating the mounting of the PSD at the exit aperture of the module. (Notwithstanding the above, in some embodiments, the entire piece of silicon is thinned, and then mounted at the exit aperture via, for example, a glass substrate that is bonded onto the silicon, as described below with reference to FIG. 3.)

Initial thickness T1 may be, for example, on the order of 350 μm, while T2 may be less than 20 μm, such as approximately 10 μm, or even less than 10 μm, such as less than 5 μm. Due to the relative thinness of thin region 44, PSD 40 is highly transmissive, such that the PSD does not significantly compromise the effectiveness of the scan. For example, it is estimated that a piece of silicon having a thickness of 2.5 μm absorbs less than 5% of 940 nm light that passes therethrough. In some embodiments, to further facilitate the transmission of light through the PSD, an anti-reflective coating is applied to one or more surfaces of the photosensitive material, in order to reduce any light-scattering effects.

Figure 3:
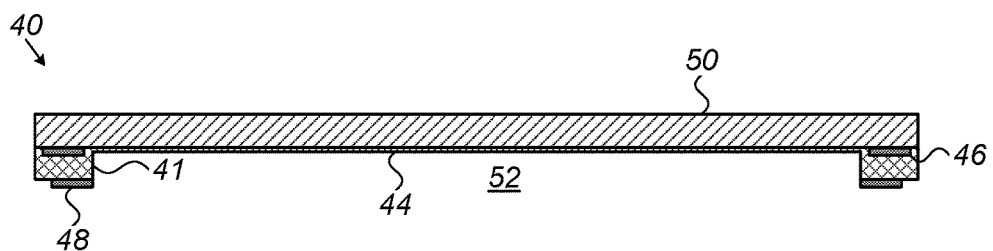
FIG. 3 presents a cross-sectional view of a position sensing device, in accordance with some embodiments described herein.

Reference is now made to FIG. 3, which presents a cross-sectional view of PSD 40, in accordance with some embodiments described herein.

For embodiments in which thickness T2 of thin region 44 is particularly small (e.g., less than 10 μm), it may be necessary to reinforce the thin region, such as to maintain the structural integrity thereof. Hence, in some embodiments described herein, an optically transparent (and, typically, electrically-insulative) support 50 is coupled to thin region 44. (In the context of the present application, including the claims, an "optically transparent" material is a material that transmits, without scattering, at least 90% of a light beam that impinges on the material, for at least one relevant range of optical wavelengths.) Support 50, which is configured to provide structural support to thin region 44, may comprise any suitable optically transparent material, including, for example, glass and/or an epoxy. For example, FIG. 3 shows support 50 embodied as a transparent glass substrate, which is bonded to the photosensitive material. Due to the transparency of the support, the support does not interfere with the transmission of light through the PSD.

In some embodiments, as shown, support 50 is coupled to the "outer" face of the photosensitive material. In such embodiments, grooves may be formed in the photosensitive material, and cathodes 46 placed in the grooves, such that the cathodes do not interfere with placement of the support. Alternatively or additionally, support 50 may be placed within the cavity 52 that the photosensitive material is shaped to define, adjacent to the "inner" face of thin region 44. For example, alternatively or additionally to mounting a glass substrate onto the outer face (as shown in the figure), an epoxy may be inserted, in liquid form, into cavity 52. Upon solidifying, the epoxy provides structural support to the thin region. (It is noted that in this context, the terms "inner" and "outer" are used for ease of description only; in practice, the PSD may be mounted such that either the "inner" or "outer" face of the photosensitive material faces away from the module.)

Figure 4A:
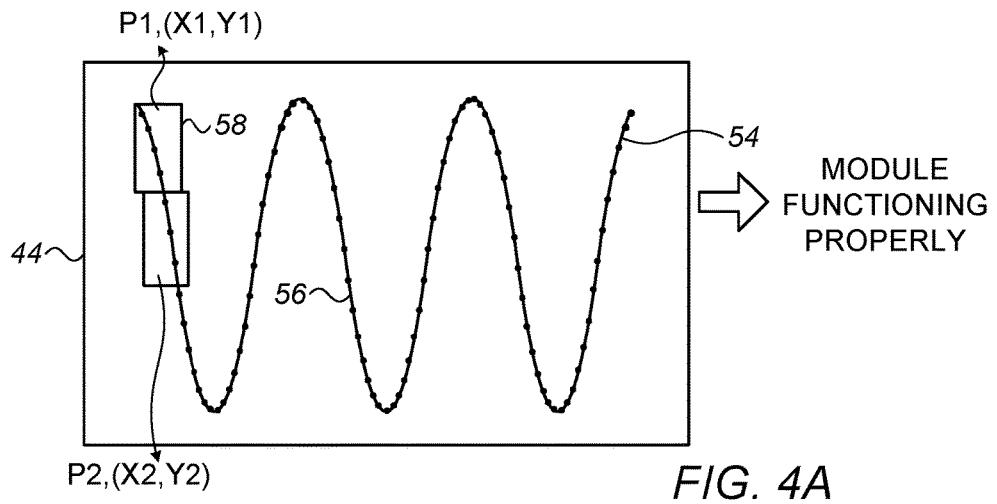
FIGS. 4A-C are schematic illustrations depicting the operation of a laser-scanning system, in accordance with some embodiments described herein.
Figure 4B:
Figure 4C:
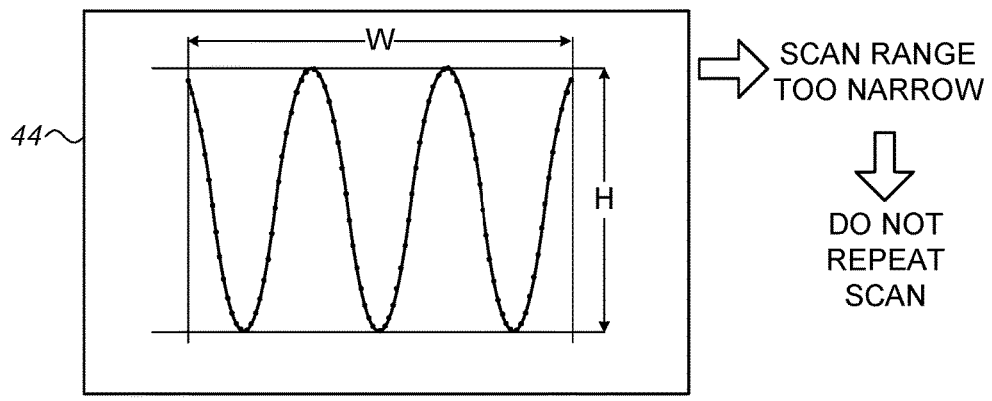

Reference is now made to FIGS. 4A-C, which are schematic illustrations depicting the operation of system 20, in accordance with some embodiments described herein.

FIG. 4A shows a face of thin region 44, over which is overlaid, by way of illustration, a scan pattern 54. Scan pattern 54 represents the pattern that is traced over the face of thin region 44 by the emitted light beams during a particular scanning routine. Each indicator 56 on the scan pattern marks a point at which a light beam passes through the PSD during the scan. (In the particular example shown in FIG. 4A, the scan traces a sinusoidal pattern. It is noted, however, that techniques described herein may be applied to any suitable scanning pattern.)

As the scan proceeds, the processor monitors the power with which, and/or the position at which, the light beams strike (and pass through) the PSD. Typically (but not necessarily), due to technical constraints, such monitoring is not performed on a "per-beam" basis; rather, the power and/or positions values are acquired by averaging or integrating over several light beams.

For example, the processor may divide the total duration of the scan into a plurality of "integration time periods," during each of which the processor, by integrating the signals received from PSD detector 39, calculates the power that is delivered by the laser. This division is indicated by the boxes 58 shown in the figure. In particular, per the illustrated embodiment, the processor first measures the power P1 delivered by the laser during the first integration time period of the scan, by integrating the magnitudes of electrical currents generated in response to light beams striking the PSD at the four points inside the first box 58. The processor then measures the power P2 delivered by the laser during the second integration time period of the scan, by integrating the magnitudes of electrical currents generated in response to light beams striking the PSD at the three points inside the second box 58. In this manner, the processor measures the power delivered by the laser during each of the integration time periods during which system 20 is active.

Typically, the integration time periods are of equal duration. For example, a scan having a total duration of 30 ms may be divided into integration time periods having equal durations of, for example, 10 µs. As indicated in the figure by the differing number of indicators 56 in the first and second boxes, the number of beams that strike (and pass through) the PSD may vary between the integration time periods, depending on the parameters of the scanning routine.

FIG. 4A shows a scenario in which the scanning module is functioning properly. In such a scenario, the processor ascertains that P1, P2, etc. are below a predetermined threshold, and, in response thereto, allows the scanning module to continue operating.

In some embodiments, position information is acquired during each of the integration time periods, alternatively or additionally to the power information. Thus, for example, the processor may derive, from the signals received from the PSD detector, the average position (X1, Y1) at which light passed through the PSD during the first period of time. Similarly, the processor may derive the average position (X2, Y2) at which light passed through the PSD during the second period of time. Such position information may be used to ascertain the range of the scan, as further described below with respect to FIG. 4C.

Alternatively or additionally, such position information may be used to ascertain the amount of power-per-area that is delivered by the laser. For example, the processor may derive N power measurements {P1, P2, . . . PN}, and N position measurements {(X1, Y1), (X2, Y2), . . . (XN, YN)}, over N integration time periods of equal duration. The processor may then compute the power delivered per unit area as (P1+P2+ . . . PN)/(N*A), where A is the area covered by the N positions. The processor may then, for example, compare the computed power-per-area to the appropriate IEC threshold.

FIG. 4B shows a scenario in which the scanning module is malfunctioning, in that the power emitted by the laser is too high. (This is depicted by the larger size of indicators 56, relative to FIG. 4A.) In this scenario, the processor ascertains that, during the first integration time period, the power P1 exceeds a particular threshold, and, in response thereto, aborts the scan, i.e., terminates the scan before the laser has emitted all of the light beams that would otherwise have been emitted during the scan. Typically, in such a situation, the scan is aborted immediately; for example, as shown in FIG. 4B, the processor may abort the scan immediately following the first integration time period, or at least before the end of the second integration time period.

Another case of malfunction is depicted in FIG. 4C. In this case, the mirror is not rotating properly, such that the range of the scan is narrower than a threshold range. In this case, too, the processor may use the PSD to ascertain that the laser-scanning module is malfunctioning, and, in response thereto, inhibit the laser from further operation. For example, the processor may measure the width W and/or the height H of scan pattern 54. In response to width W being less than a threshold width, and/or height H being less than a threshold height, the processor may ascertain that the scan range is narrower than the threshold range. In response thereto, the processor may inhibit the laser-scanning module from repeating the scan.

Figure 5:
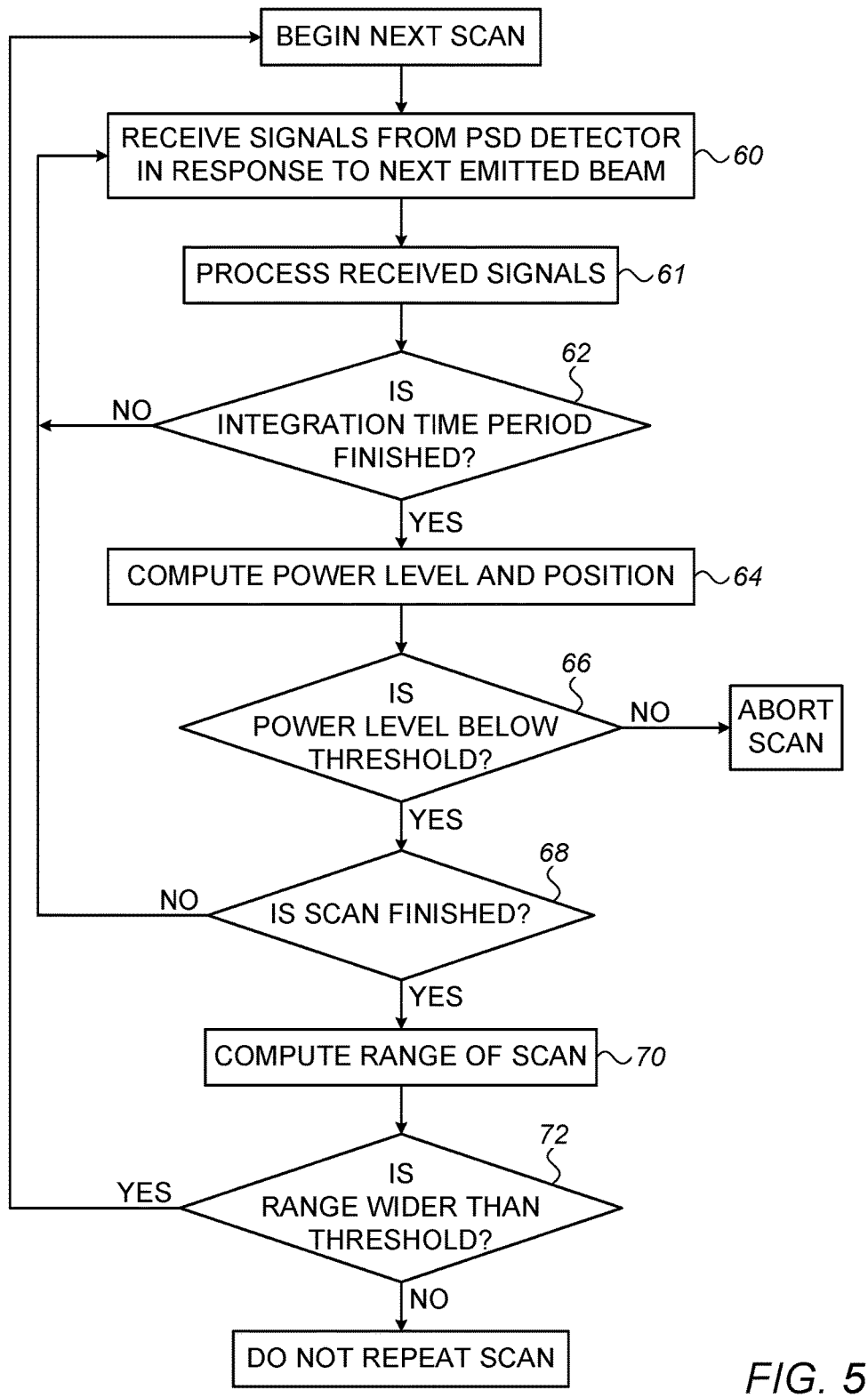
FIG. 5 is a flow diagram for a monitoring method performed by a processor belonging to a laser-scanning system, in accordance with some embodiments described herein.

Reference is now made to FIG. 5, which is a flow diagram for a monitoring method performed by processor 36, in accordance with some embodiments described herein. This monitoring method was generally outlined with reference to FIGS. 4A-C, but is nonetheless presented again, in greater detail, in FIG. 5.

Following the beginning of a scanning routine, the processor, at a receiving step 60, receives signals from PSD detector 39, which are generated in response to the emitted beams striking the PSD. For example, the processor may receive, from the PSD detector, a set of four signals—which indicate, respectively, four separate electrical-current magnitudes (as described above)—for each beam that strikes the PSD. The processor, at a processing step 61, processes the received signals, by, for example, adding the electrical-current magnitudes to the total magnitudes that have been received thus far during the current integration time period. Next, at a first checking step 62, the processor checks whether the current integration time period is finished. For example, the processor may check whether a certain duration of time has transpired, and/or whether a certain number of light beams have been emitted from the laser.

Upon the end of the integration time period, the processor, at a computing step 64, computes the power level and position of the light beams during the integration time period. The processor then checks, at a second checking step 66, whether the power level falls below the threshold power level. If the power level does not fall below the threshold, the processor aborts the scan, as described above with reference to FIG. 4B. Otherwise, the processor checks, at a third checking step 68, whether the scan is finished. If the scan is not finished, the processor begins the next integration time period, and returns to receiving step 60. Otherwise, at a range-computing step 70, the processor computes the range of the scan. The processor then checks, at a fourth checking step 72, whether the range is wider than the threshold range. If not, the processor inhibits the laser-scanning module from repeating the scan, as described above with reference to FIG. 4C. Otherwise, the next scan begins.

Although the present disclosure relates mainly to laser-scanning systems, it is noted that methods and apparatus described herein may be applied to other types of optical systems. For example, some continuous-wave laser systems comprise a beam-spreading element, such as a diffractive optical element or an optical diffuser, that is configured to increase the angular spread of light beams that are emitted by a laser. For such systems, PSD 40 may be used to ascertain the power emitted by the laser, as described above for system 20. Moreover, analogously to that which was described with reference to FIG. 4C, PSD 40 may be used to ascertain a measure of spreading (e.g., an angular measure of spreading) by which the beam-spreading element has spread a beam emitted by the laser. In response to this measure of spreading being less than a threshold measure of spreading, the processor may inhibit the laser from further operation.

In some embodiments, alternatively to using a two-dimensional PSD as shown in the present figures, a plurality of one-dimensional PSDs may be used.

Although the above description relates mainly to lasers, it is noted that apparatus and methods described herein may also be used with other types of light sources, including, for example, incoherent light sources such as light-emitting diodes (LEDs).

It will be appreciated by persons skilled in the art that the present disclosure is not limited to what has been particularly shown and described hereinabove. Rather, the scope of embodiments described herein includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a position sensing device (PSD), comprising a photosensitive material comprising a thin region having a thickness of less than 10 µm;
a light source, configured to, by passing one or more light beams through the thin region of the photosensitive material of the PSD, cause one or more electrical currents to flow through the PSD; and
a processor, configured to:
in response to the electrical currents, ascertain an amount of power that is delivered by the light source, and
in response to the amount of power exceeding a threshold amount of power, inhibit the light source from further operation.

2. The system according to claim 1, wherein the light source is a laser, and further comprising a laser-scanning module comprising the laser, the PSD being positioned at an exit aperture of the laser-scanning module.

3. The system according to claim 2,
wherein the laser-scanning module is configured to perform a scan by, using the laser, emitting a plurality of light beams that include the one or more light beams, and
wherein the processor is configured to inhibit the laser from further operation by aborting the scan.

4. The system according to claim 3, wherein the processor is configured to:
ascertain the amount of power that is delivered by the laser during each of a plurality of time periods over which the scan occurs, and
in response to the amount of power exceeding the threshold amount of power during any one of the time periods, abort the scan before an end of a next one of the time periods.

5. The system according to claim 2, wherein the processor is further configured to:
in response to the electrical currents, ascertain a range of the scan, and
in response to the range being narrower than a threshold range, inhibit the laser from further operation by inhibiting the laser-scanning module from repeating the scan.

6. The system according to claim 1, wherein the processor is configured to ascertain the ascertain the amount of power that is delivered by the light source by ascertaining an amount of power per unit area that is delivered by the light source.

7. The system according to claim 1, further comprising a beam-spreading element, wherein the processor is further configured to:
in response to the electrical currents, ascertain a measure of spreading by which the beam-spreading element has spread the light beams, and
in response to the measure of spreading being less than a threshold measure of spreading, inhibit the light source from further operation.

8. The system according to claim 7, wherein the beam-spreading element is selected from the group consisting of: a diffractive optical element, and an optical diffuser.

9. The system according to claim 1, wherein the photosensitive material comprises a material selected from the group consisting of: silicon, indium gallium arsenide, and germanium.

10. The system according to claim 1, wherein the photosensitive material is organic.

11. The system according to claim 1, wherein the thin region of the photosensitive material is at least partly surrounded by a thicker region of the photosensitive material having a thickness that is greater than the thickness of the thin region.

12. The system according to claim 1, wherein the thickness of the thin region of the photosensitive material is less than 5 µm.

13. The system according to claim 1, further comprising an optically transparent support, which is configured to provide structural support to the thin region of the photosensitive material, coupled to the thin region of the photosensitive material.

14. The system according to claim 13, wherein the optically transparent support comprises a glass substrate.

15. The system according to claim 13, wherein the optically transparent support comprises an epoxy.

16. A method for operating a light source, the method comprising:

using the light source, by passing one or more light beams through a thin region of a photosensitive material belonging to a position sensing device (PSD), the thin region having a thickness of less than 10 µm, causing one or more electrical currents to flow through the PSD;

in response to the electrical currents, ascertaining an amount of power that is delivered by the light source; and in response to the amount of power exceeding a threshold amount of power, inhibiting the light source from further operation.

17. The method according to claim 16, wherein the light source is a laser belonging to a laser-scanning module, wherein ascertaining the amount of power that is delivered by the laser comprises ascertaining the amount of power that is delivered by the laser during at least part of a scan that is performed by the laser-scanning module, and wherein inhibiting the laser from further operation comprises inhibiting the laser from further operation by aborting the scan.

18. The method according to claim 16, wherein ascertaining the amount of power that is delivered by the light source comprises ascertaining an amount of power per unit area that is delivered by the light source.

* * * * *